(No Model.)
T. A. EDISON.
ELECTRICAL TRANSMISSION OF POWER.
No. 370,126. Patented Sept. 20, 1887.
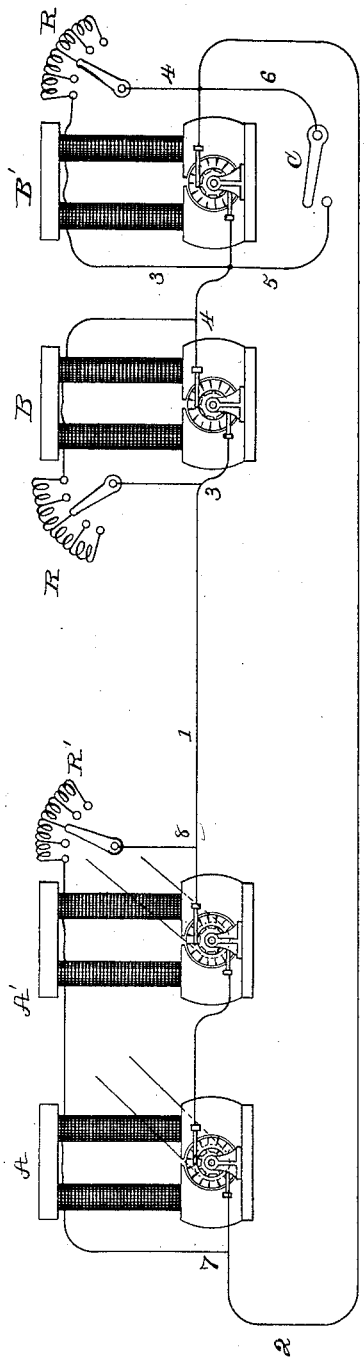
ATTEST:
E. C. Rowland
H. W. Seely
INVENTOR:
Thomas A. Edison,
By Rich'd N. Dyer,
Atty.

UNITED STATES PATENT OFFICE.

THOMAS A. EDISON, OF MENLO PARK, NEW JERSEY.

ELECTRICAL TRANSMISSION OF POWER.

SPECIFICATION forming part of Letters Patent No. 370,126, dated September 20, 1887.

Application filed June 7, 1883. Serial No. 97,326. (No model.)

*To all whom it may concern:*

Be it known that I, THOMAS A. EDISON, of Menlo Park, in the county of Middlesex and State of New Jersey, have invented a new and useful Improvement in Electrical Transmission of Power, (Case No. 568,) of which the following is a specification.

This invention relates to the running of independent electro-dynamic motors—that is, separate motors not connected with the same driving-shaft—by current produced by two or more electrical generators, and has for its object to regulate simultaneously the generation of current by such generators according to the number of motors in circuit from them or the speed at which such motor or motors are run. While such simultaneous regulation of the generators is applicable to the running of a single motor, or of a number of motors arranged in any suitable manner, yet I prefer to use it in connection with a number of independently-controllable electro-dynamic motors provided with means for removing individual motors from operation without affecting the remainder of the motors. The motors, therefore, are preferably arranged in series, with their field-coils in independent shunts, each shunt being provided with a regulating-resistance, and shunts are formed around the motors for cutting them out of circuit. There are, however, very many other ways in which the motors could be arranged. For instance, in multiple arc across main conductors, with their fields either in series or in separate multiple-arc circuits; or the fields may be energized from a separate local source and regulated simultaneously, the armatures being either in series or multiple arc.

In carrying out my invention the manner of arranging the generators so that they may be simultaneously regulated is as follows: The armatures of the two or more dynamo-electric machines which are employed as generators are placed in series, and the field-coils of all the machines are included in a single shunt-circuit. This circuit is provided with an adjustable resistance, by adjusting which the current in the shunt is regulated, and therefore the generation of current by all the machines is regulated simultaneously. This arrangement is illustrated diagrammatically in the accompanying drawing.

A A' are dynamo-electric machines, and B B' electro-dynamic motors. The motors B B' are connected in series in the main circuit 1 2. The field-coils of each motor are in a shunt-circuit, 3 4, and each shunt-circuit is provided with an adjustable resistance, R. Around the motor B' is formed a shunt, 5 6, provided with a circuit-controller, C, for cutting the motor out of circuit. The generators A A' are also connected in series, and the main conductors 1 2 extend from them.

A shunt-circuit, 7 8, from the main conductors includes the coils of the field-magnets of both generators, and an adjustable resistance, R', is placed in this shunt for regulating the generators simultaneously.

It is evident that any desired number of generators could be employed in connection with any number of independent electro-dynamic motors.

As motors are placed in or cut out of circuit, the resistance R' is adjusted to regulate the generation of current according to these changes, so that current enough is always supplied for the motors in use.

What I claim is—

1. The combination, with mechanically-independent electro-dynamic motors, of two or more dynamo or magneto electric machines arranged in series connected with said motors, said machines having all their field-coils connected in one circuit, and said circuit being provided with an adjustable resistance, substantially as set forth.

2. The combination of two or more mechanically-independent electro-dynamic motors, with their armatures connected in series, a shunt around the armature of each motor, including its field-magnet coils, and an adjustable resistance in each shunt, with two or more dynamo-electric machines arranged in series connected with said motors, said machines having all their field-coils connected in one circuit, and said circuit being provided with an adjustable resistance, substantially as set forth.

This specification signed and witnessed this 1st day of June, 1883.

THOS. A. EDISON.

Witnesses:
H. W. SEELY,
EDWARD H. PYATT.